Sept. 5, 1933.  R. A. KERNS  1,925,666
REAR VIEW MIRROR FOR AUTOMOBILES
Filed Sept. 11, 1931
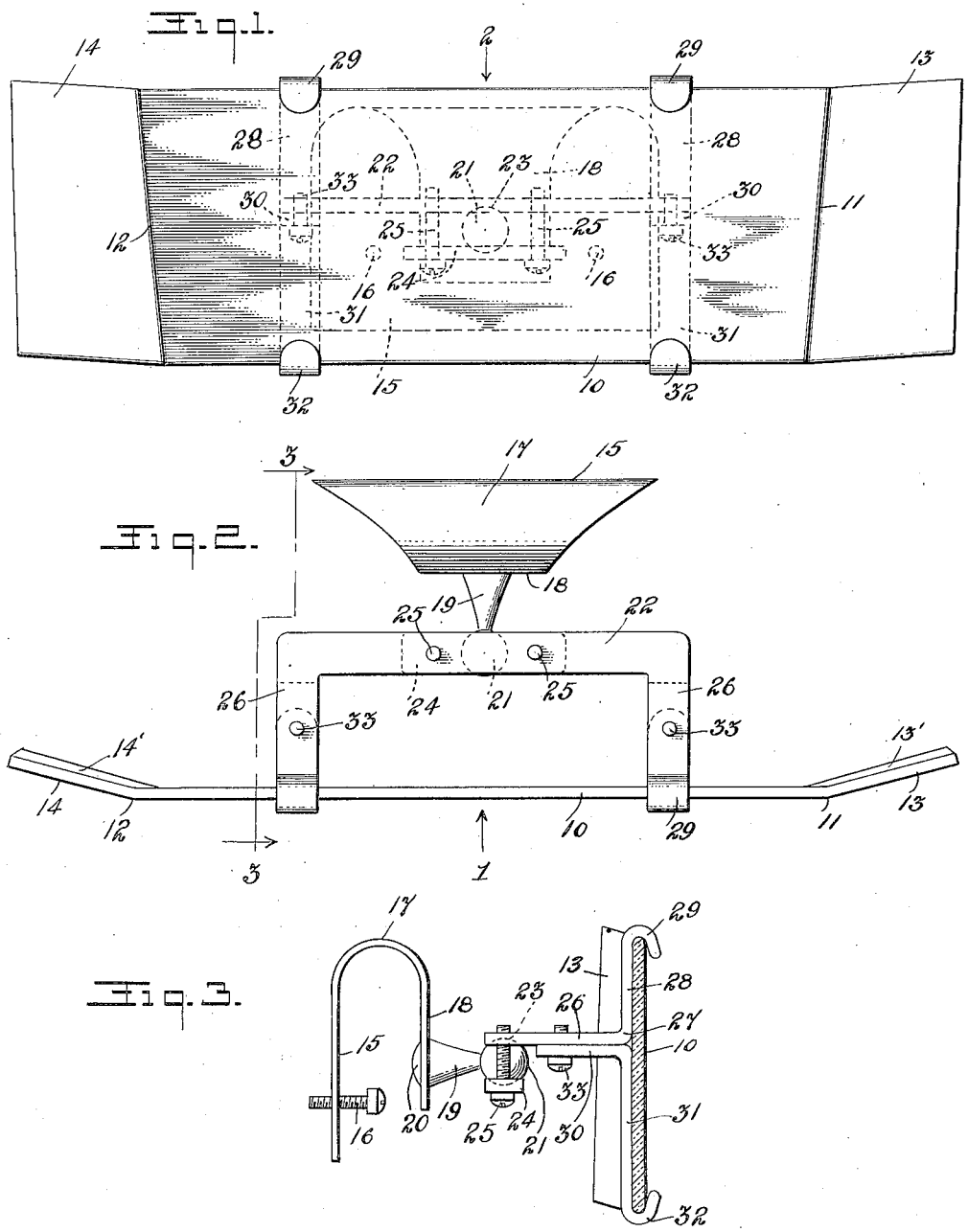
WITNESS:
INVENTOR
Roland Allen Kerns
BY
Joshua R. H. Potts
HIS ATTORNEY Patented Sept. 5, 1933

1,925,666

UNITED STATES PATENT OFFICE 1,925,666

REAR VIEW MIRROR FOR AUTOMOBILES

Roland Allen Kerns, Philadelphia, Pa.

Application September 11, 1931
Serial No. 562,345

4 Claims. (Cl. 88—1)

This invention relates to rear view mirrors for automobiles, and has for an object to provide an improved means for reflecting traffic at the rear, embodying wings fixed at predetermined angles relative to the main reflector, and adapted to reflect traffic from other angles.

A further object of the invention is to provide a reflector of the mirror type having a plane reflecting surface with integral bent or angled terminal wings, said wings declining as to their incident position, relative to the incident position of the main reflector, and means for adjusting the reflecting unit as an entirety.

The invention, therefore, comprises a substantially plane reflecting surface of the mirror type with integral terminal wings disposed at angles relative to the main reflecting surface, such angles receiving incident rays from lateral positions, also from positions at a lower level than the incident rays received by the main reflector, with improved means for adjusting the reflecting unit as an entirety.

The drawing illustrates an embodiment of the invention and the views therein are as follows:

Figure 1 is a view of the reflector in front elevation,

Figure 2 is a view of the reflector in top plan, as indicated by arrow 2 at Figure 1, also showing arrow 1 as the position of Figure 1, and Figure 3 is a sectional view taken on line 3—3 of Figure 2.

Like characters of reference indicate corresponding parts throughout the several views.

The improved rear view mirror which forms the subject-matter of this application comprises a plane reflecting surface 10. This surface may be of the ordinary mirror type, that is to say, composed of glass silvered in the usual well-known manner, or may be a reflecting surface of any other material selected.

The plate of material is bent at 11 and 12 to form terminal wings. These bends 11 and 12 are not upon lines perpendicular to the top or bottom of the reflecting surface 10, but are upon such angles relative thereto that the wings 13 and 14 will present surfaces inclined downwardly. This is brought about by the angular position of the bends 11 and 12.

The angles of the bends 11 and 12, as shown in the drawing, are only illustrative, and any other angles may be substituted therefor and the degree of bend of the wings 13 and 14 relative to the plane surface 10 may likewise be varied as circumstances make necessary or desirable.

In any event, assuming that the reflecting surface 10 is in a vertical position, and the incident rays thereto horizontal, the wings 13 and 14 will receive incident rays from a lower position and in an upwardly inclined direction.

It is obvious that these wings 13 and 14 are provided at these angles for the purpose of reflecting traffic as it may occur upon opposite sides of the vehicle, and while the plane reflecting surface 10 is intended for reflecting the incident rays through the rear window or its equivalent, the wings will reflect from points nearer to the position of the mirror than those reflected by the central surface.

The bending of these wings 13 and 14 will cause the top plan of the device, as shown at Figure 2, to show the rear of these wings in perspective, as shown at 13' and 14'.

To support the device, which is an integral structure, a bracket is provided comprising a plate 15 adapted to be secured to any part of the motor vehicle found desirable, the screws 16 being provided for that purpose. This plate 15 is curved or bent at 17 and this curve facilitates the bending of the entire structure so that the plate 15 may occupy a vertical position, or any angle relative thereto as the construction of the vehicle makes desirable.

The plate is continued by a front section 18 which likewise, by bending at the curve 17, may be positioned as may be found desirable. This front part 18 is provided with a lug 19 secured to the front section 18 in any approved manner, as by upsetting, as shown at 20.

This lug 19 is provided with a ball 21, preferably though not necessarily integral therewith. A bar 22 is countersunk as indicated at 23 to accommodate the upper portion of the ball 21 and a keeper 24 is likewise countersunk and is attached to the bar 23 by tension bolts 25.

By loosening or tightening the tension bolts 25, the frictional engagement of the bar 22 and keeper 24 upon the ball 21 may be varied for purpose of adjustment.

The bar 22 is provided with forwardly extending arms 26, which are bent at 27 to provide upwardly extending sections 28 having hooks 29 formed thereon for engaging over the top edge of the reflector.

A clamping structure comprising an arm 30 with a section 31 and hook 32 hooked under the lower edge of the reflector, and clamping screws 33 are employed for clamping this retainer in clamping engagement with the hooks 29 to hold the reflector firmly.

By this arrangement reflectors may be changed at will by merely loosening the clamping screws 33, and when replaced or repositioned, may be adjusted as to angularity by loosening the screws 25, changing the position relative to the ball 21, and again tightening the screws 25.

The device, therefore, lends itself to the most accurate adjustment, depending upon the construction of the vehicle to which it is attached and the whim of the user.

Of course, the rear view mirror for automobiles herein set forth may be modified and changed in various ways without departing from the invention herein described and hereafter claimed.

I claim:—

1. A rear view reflector comprising a plane reflecting surface and terminal reflecting wings deflected from the plane surface upon lines converging downwardly from the upper edge to the lower edge of the plane surface.

2. A rear view reflector comprising a plane reflecting surface and terminal reflecting wings fixedly deflected from the plane surface upon lines converging downwardly from the upper edge to the lower edge of the plane surface.

3. A unitary rear view reflector comprising a plane reflecting surface having major and minor axes, and a terminal reflecting wing deflected from the plane surface upon a line extending downwardly and converging toward the minor axis.

4. A unitary rear view reflector comprising a plane reflecting surface having major and minor axes, and a terminal reflecting wing fixedly deflected from the plane surface upon a line extending downwardly and converging toward the minor axis.

ROLAND ALLEN KERNS.